United States Patent [19]
Heubusch et al.

[11] Patent Number: 5,586,506
[45] Date of Patent: Dec. 24, 1996

[54] BALL-AND-SOCKET COUPLING, PARTICULARLY FOR RAILWAY CARS

[75] Inventors: Harald Heubusch, Büchenbach; Jörg Rösler, Feucht, both of Germany

[73] Assignee: AEG Schienenfahrzeuge GmbH, Hennigsdorf, Germany

[21] Appl. No.: 571,117

[22] Filed: Dec. 12, 1995

[30] Foreign Application Priority Data

Dec. 21, 1994 [DE] Germany .............................. 9420230 U

[51] Int. Cl.⁶ ..................................................... B61G 5/00
[52] U.S. Cl. ................................ 105/3; 213/75 R; 403/76
[58] Field of Search ..................................... 213/75 R, 74, 213/77; 105/1.4, 3, 4.1, 8.1; 403/79, 76, 157, 159; 280/511, 492, 493, 403

[56] References Cited

U.S. PATENT DOCUMENTS

| | | | |
|---|---|---|---|
| 3,216,370 | 11/1965 | Kulieke . | |
| 5,131,331 | 7/1992 | Lynch et al. | 105/3 |
| 5,172,819 | 12/1992 | Daugherty et al. | 403/76 |
| 5,209,596 | 5/1993 | Matczak et al. | 403/76 |
| 5,456,185 | 10/1995 | Rother et al. | 105/3 |
| 5,520,295 | 5/1996 | Wiebe | 280/511 |

FOREIGN PATENT DOCUMENTS

| | | |
|---|---|---|
| 0343482 | 11/1989 | European Pat. Off. . |
| 0559635 | 9/1993 | European Pat. Off. . |
| 0612646 | 8/1994 | European Pat. Off. . |
| 2030481 | 12/1971 | Germany . |
| 4404878 | 3/1995 | Germany . |
| 676220 | 12/1990 | Switzerland . |

*Primary Examiner*—Mark T. Le
*Attorney, Agent, or Firm*—Spencer & Frank

[57] ABSTRACT

A ball-and-socket coupling for connecting two bodies to one another. The coupling includes a U-shaped welded support frame having a base as well as first and second legs extending from the base. The two legs are spaced from one another and define an open side of the frame opposite the base. The first leg forms a ball-holding pin, while the second leg is adapted to be attached to one of the two bodies. The ball-holding pin traverses and carries a ball of the coupling. A support bracket adapted to be attached to the other of the two bodies carries a socket in which the ball nests. A lid closes off the open side of the frame, and a securing device releasably attaches the lid to the frame.

7 Claims, 4 Drawing Sheets

BALL-AND-SOCKET COUPLING, PARTICULARLY FOR RAILWAY CARS

CROSS REFERENCE TO RELATED APPLICATION

This application claims the priority of German Application No. G 94 20 230.3 filed Dec. 21, 1994, which is incorporated herein by reference.

BACKGROUND OF THE INVENTION

The invention relates to a ball-and-socket coupling, particularly for railway cars and is of the type that has a first support (such as a bracket) which is affixed to a first car body and which carries a coupling ball as well as a second support (such as a bracket) which is affixed to a second car body and which carries a socket that receives the ball. Such couplings have been known for a long time and are described, for example, in *Dubbels Taschenbuch für den Maschinenbau* (Mechanical Engineering Handbook), pages 678–693.

SUMMARY OF THE INVENTION

It is an object of the present invention to provide an improved ball-and-socket coupling that has a modular structure, is simple to instal even by retrofitting, requires little maintenance and has a long service life.

This object and others to become apparent as the specification progresses, are accomplished by the invention, according to which, briefly stated, the ball-and-socket coupling for connecting two bodies to one another includes a U-shaped welded support frame having a base as well as first and second legs extending from the base. The two legs are spaced from one another and define an open side of the frame opposite the base. The first leg forms a ball-holding pin, while the second leg is adapted to be attached to one of the two bodies. The ball-holding pin traverses and carries a ball of the coupling. A support bracket adapted to be attached to the other of the two bodies carries a socket in which the ball nests. A lid closes off the open side of the frame, and a securing device releasably attaches the lid to the frame.

In contrast to conventional constructions, in which the holding pin is loosely inserted with the ball into the socket, according to the invention the holding pin is a component of a permanent, welded construction onto which the ball is inserted with the socket. Thereafter the ball-and-socket unit is closed by attaching a lid thereto with a screw connection. This arrangement yields the advantages as concerns assembly, maintenance and service life.

The ball may be secured to the holding pin in the axial direction as a fixed coupling or may be slidingly guided, as a loose coupling, in the axial direction on the holding pin or on a sleeve enclosing the holding pin. Advantageously, holding elements for further components, such as bellows, cable holders, rotary platforms and the like may be disposed in the frame or in the lid.

According to a preferred embodiment of the invention, two ball-and-socket couplings are disposed axially one above the other between two car bodies, wherein the lower coupling is a fixed coupling located between a floor of the first car body and a rotary platform on the second car body, whereas the upper coupling is a loose coupling located between securing brackets of the two car bodies.

The holding pin can be configured as a shaft for two balls located axially one above the other.

DESCRIPTION OF THE PREFERRED EMBODIMENTS

Figure 1:
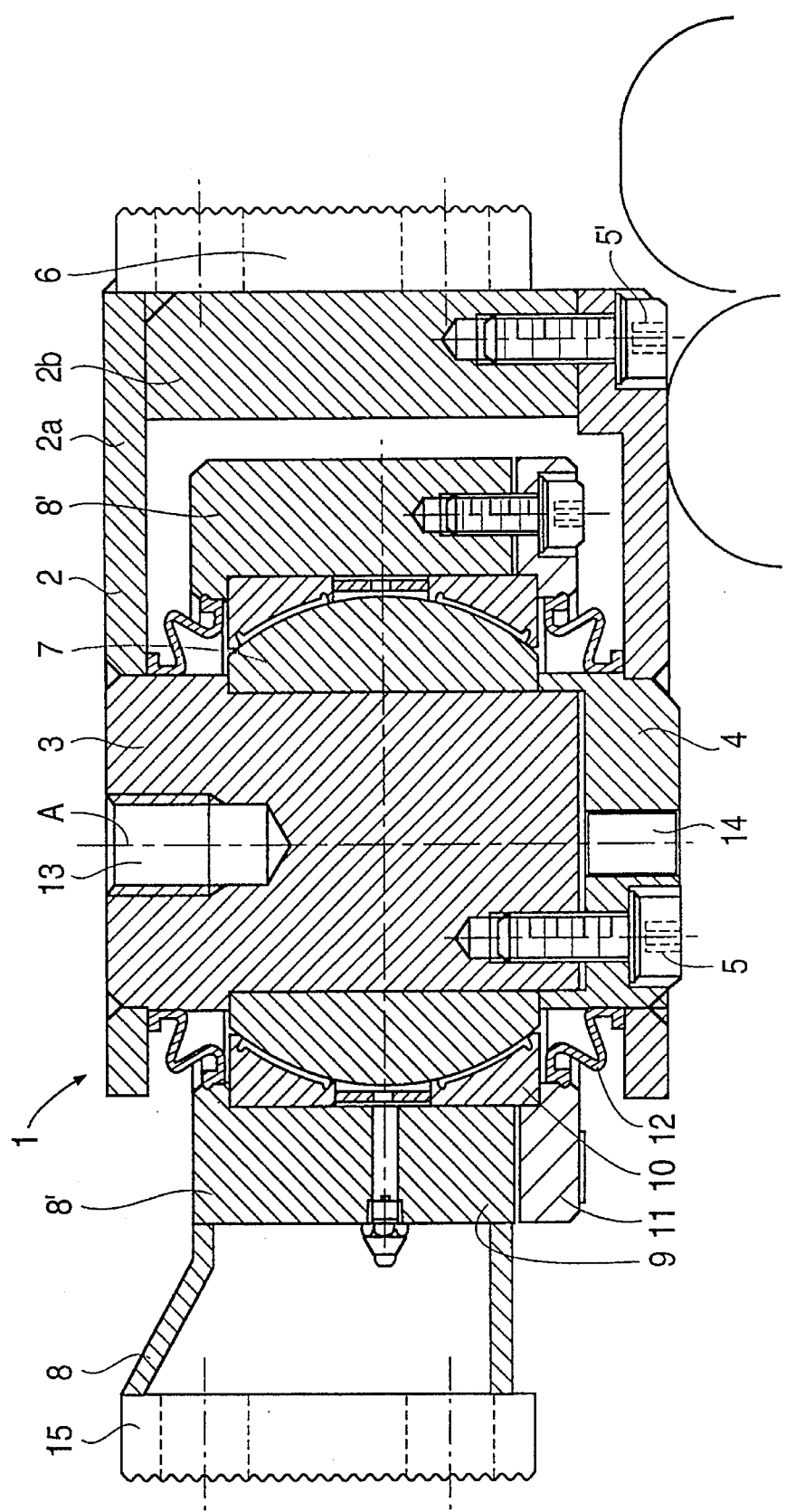
FIG. 1 is an axial sectional view of a first preferred embodiment configured as a fixed ball-and-socket coupling.

The ball-and-socket coupling 1 according to FIG. 1 comprises a downwardly open frame 2 which has a welded-on ball-holding pin 3 having a longitudinal axis A and carrying a ball 7 received in a socket 10 connected to a bracket 8, 8'. Frame 2 is, at its end oriented away from the coupling, provided with a toothed plate 6 for connection to a first car body. Thus, the frame 2 is a U-shaped component which has a base 2a and two legs. One of the legs is formed by the ball-holding pin 3 and the other leg is the member 2b to which the toothed plate 6 is attached.

The bracket 8, 8' is, at its end oriented away from the coupling, provided with a toothed plate 15 for connection to a second car body. Ball 7 is, with socket 10, inserted from below on the holding pin 3 and engages at the top an abutment edge of holding pin 3. Ball 7 is secured in a downward direction by a lid 4 and is, by means of abutments, axially positioned on the lid 4. Lid 4 is secured to the frame 2 and the holding pin 3 from below by means of a screw connection 5, 5'. Ball 7 is affixed axially by holding pin 3 and lid 4 and therefore the ball-and-socket coupling 1 is a fixed coupling. Threaded blind bores 13, 14 for connection to other parts are located in lid 4 and holding pin 3. The bracket for the socket 10 comprises a holding part 8 and a circular plate 8' connected to the holding part 8. A seal 12 around the joint is inserted between the plate 8' and frame 2.

Figure 2:
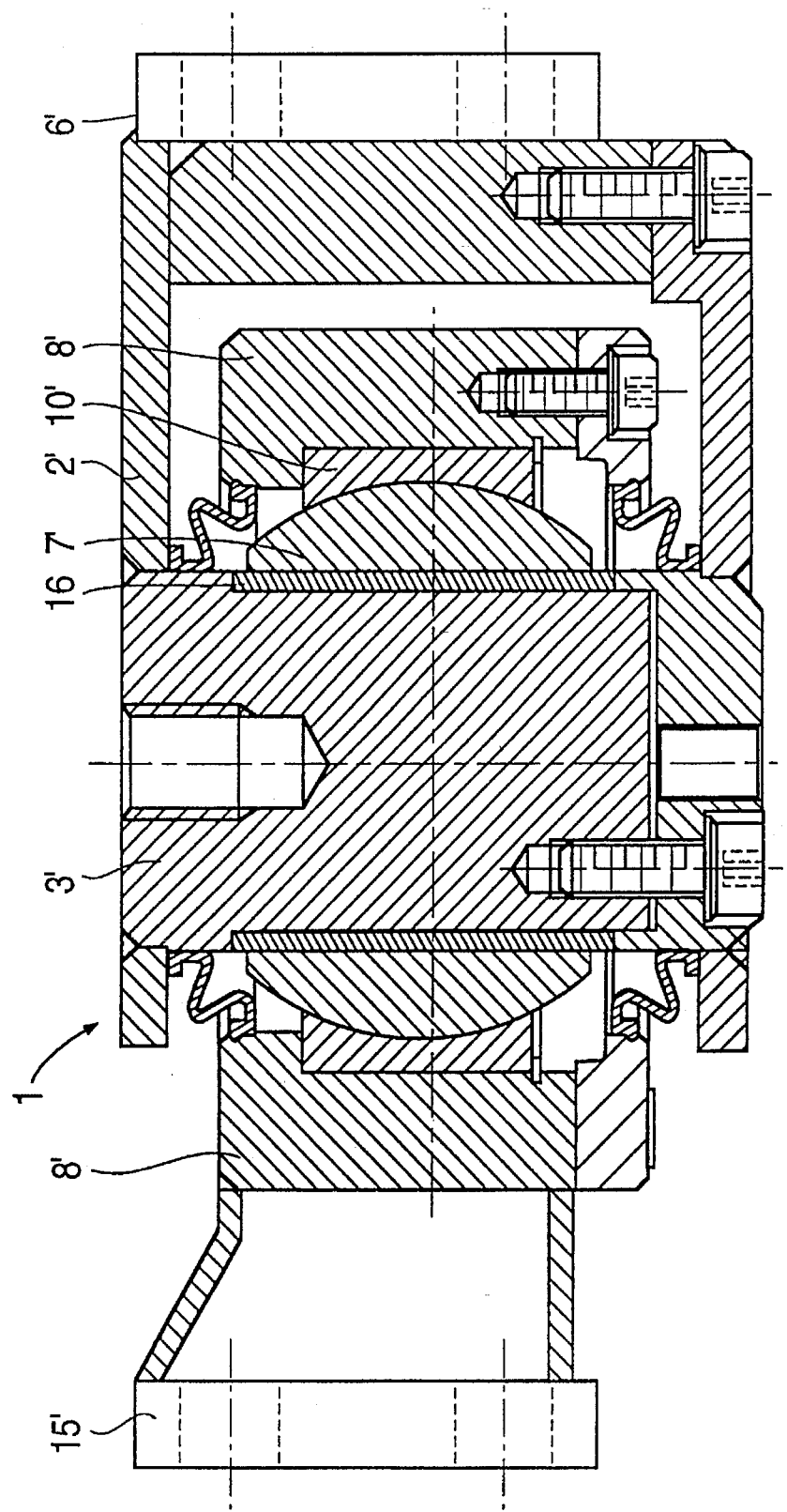
FIG. 2 is an axial sectional view of a second preferred embodiment configured as a loose ball-and-socket coupling.

FIG. 2 illustrates a ball-and-socket coupling 1' which is essentially identical to that shown in FIG. 1, except that the ball-and-socket coupling 1' is configured as a loose coupling. For this purpose, the ball 7' has an axial play on a sleeve 16 that surrounds holding pin 3'. Because of this play, plate 8' with socket 10' and ball 7' can also move in the axial direction with respect to frame 2'. The connection to the car bodies is effected by screwed-on plates 6' 15'

Figure 3:
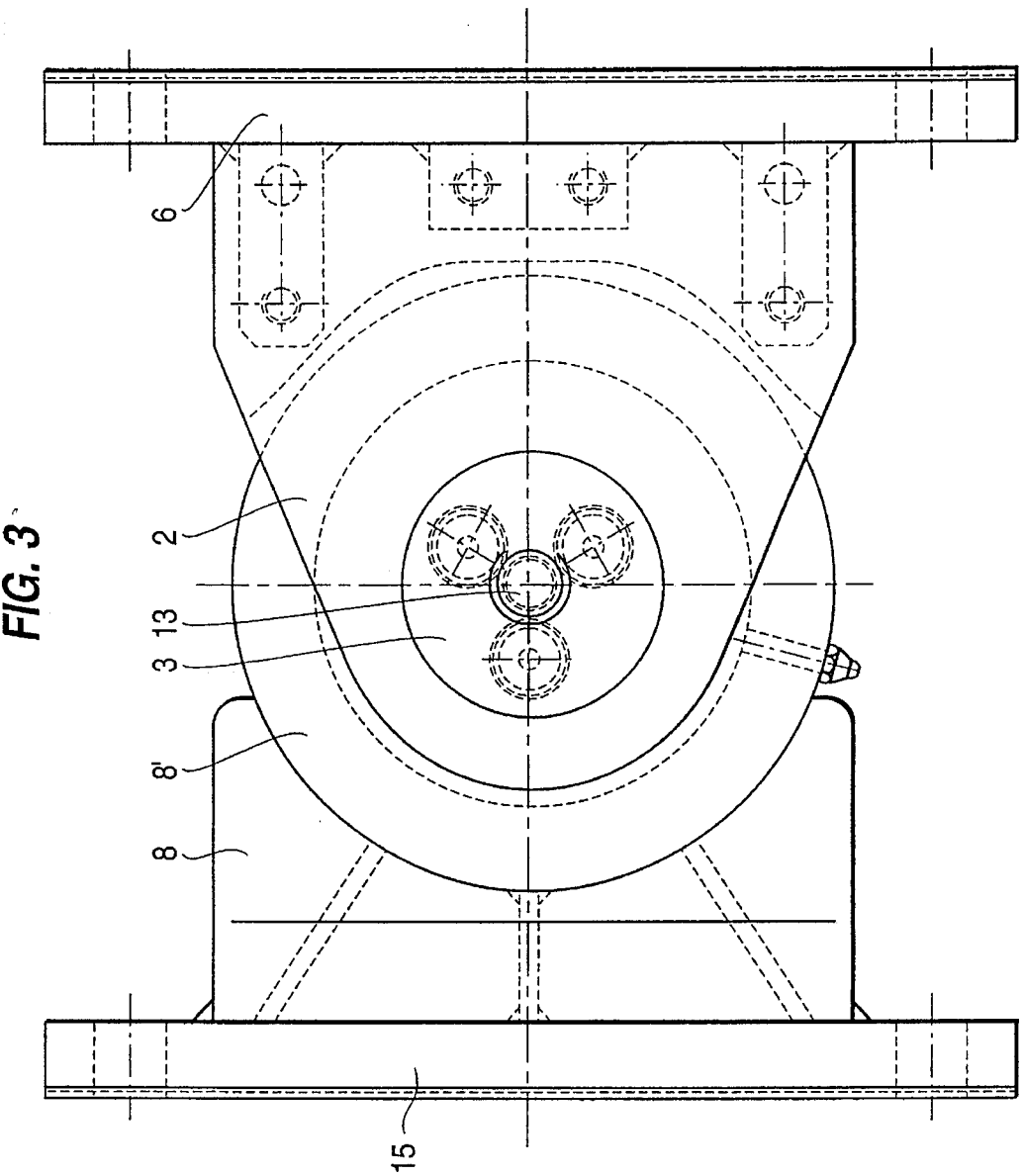
FIG. 3 is a top plan view of the structure according to FIG. 1.

FIG. 3 shows the fixed coupling of FIG. 1 in a top plan view. The frame 2, fixedly carrying the holding pin 3, is connected to the non-illustrated first car body by means of the toothed plate 6 The bracket 8, 8' fixedly carrying the socket 10, is coupled to the non-illustrated second car body by means of the toothed plate 15. It is noted that a top plan view of the construction shown in FIG. 2 would be substantially identical to FIG. 3.

Figure 4:
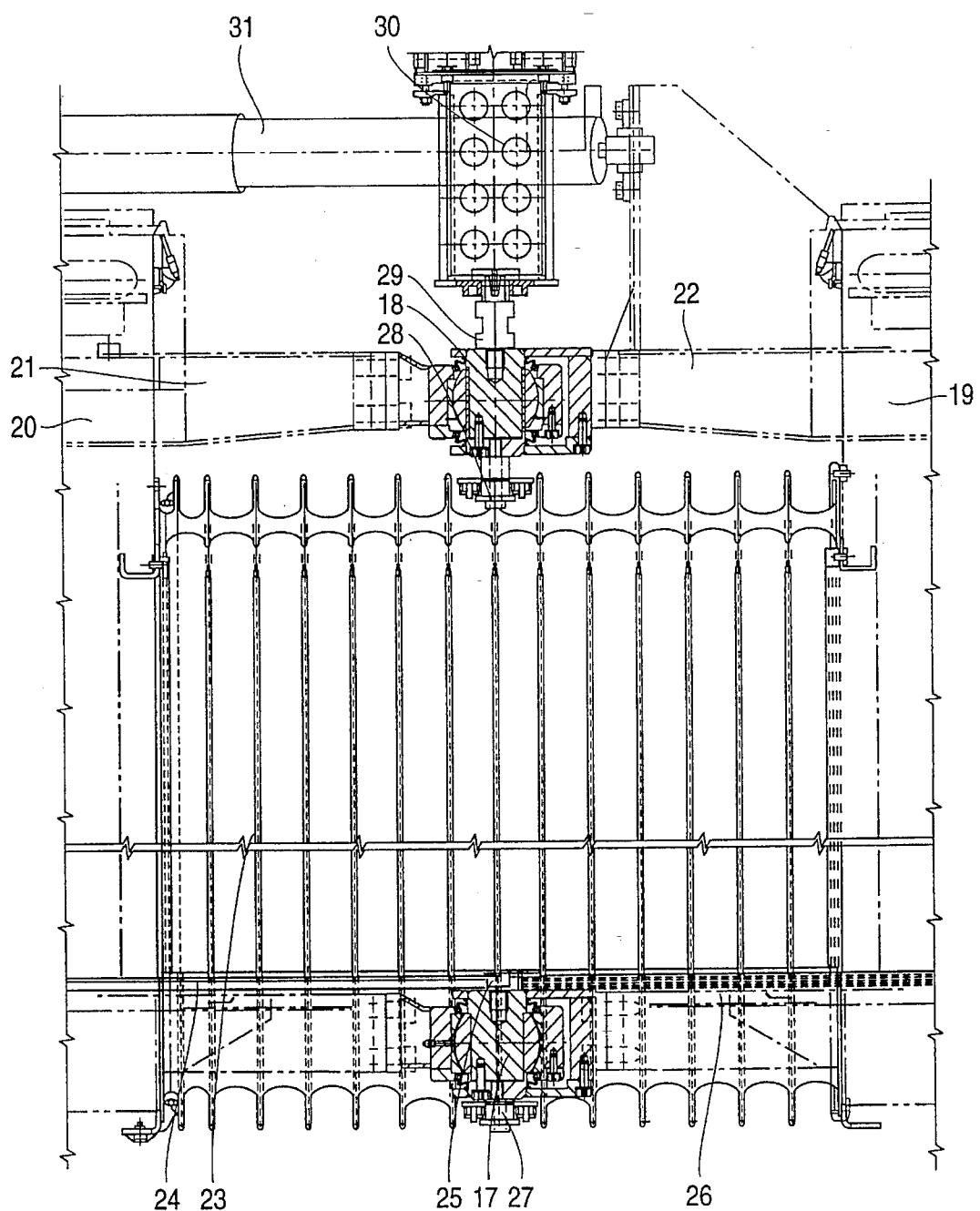
FIG. 4 is a sectional side elevational view of ball-and-socket couplings at the transition between two car bodies.

FIG. 4 shows the arrangement of the ball-and-socket couplings according to the invention between two car bodies and 20. In the illustrated example the upper ball-and-socket coupling 18 is configured as a loose coupling, as shown in FIG. 2, and the lower ball-and-socket coupling 17 is configured as a fixed coupling, as shown in FIG. 1. The upper ball-and-socket coupling 18 is connected on both sides to brackets 21, 22 which, in turn are secured to the respective car bodies 20 and 19. A receptacle 29 for a cable holder 30 is screwed into the upper threaded blind bore of the upper ball-and-socket coupling 18, and a holding element 28 for a bellows 23 is screwed into the lower threaded blind bore of the upper ball-and-socket coupling 18. The lower ball-and-socket coupling 17 is secured, by a screw threaded into the upper threaded blind bore, to a rotary platform 24 on the second car body. Further, the frame of the lower ball-and-socket coupling 17 is coupled by a screw connection to the floor 26 of the first car body. The lower ball-and-socket coupling 17 is situated between the rotary platform 24 and the floor 26. The lower threaded blind bore of the lower ball-and-socket coupling 17 supports a second holding element 27 for the bellows 23. A shock absorber 31 is disposed at the top, between the two car bodies 19, 20.

It will be understood that the above description of the present invention is susceptible to various modifications, changes and adaptations, and the same are intended to be comprehended within the meaning and range of equivalents of the appended claims.

What is claimed is:

1. A ball-and-socket coupling for connecting two bodies to one another; the coupling comprising
   (a) a U-shaped welded support frame having a base and first and second legs extending from said base; said first and second legs being spaced from one another and defining an open side of said frame opposite said base; said first leg forming a ball-holding pin and said second leg being adapted to be attached to one of the two bodies;
   (b) a ball traversed and carried by said ball-holding pin;
   (c) a support bracket adapted to be attached to the other of the two bodies;
   (d) a socket affixed to and carried by said support bracket; said ball nesting in said socket;
   (e) a lid closing said open side of said frame; and
   (f) securing means for releasably attaching said lid to said frame.

2. The ball-and-socket coupling as defined in claim 1, further comprising means for fixedly securing said ball to said ball-holding pin.

3. The ball-and-socket coupling as defined in claim 1, wherein said ball-holding pin has a longitudinal axis and further wherein said ball is slidable along the longitudinal axis of said ball-holding pin.

4. The ball-and-socket coupling as defined in claim 3, further comprising a sleeve axially surrounding and affixed to said ball-holding pin; said ball being axially slidably mounted on said sleeve.

5. The ball-and-socket coupling as defined in claim 1, further comprising attachment means carried by at least one of said frame and said lid for holding additional elements.

6. The combination of a first railway car, a second railway car and two vertically spaced, axially aligned, upper and lower ball-and-socket couplings connecting the first and second railway cars with one another; each said ball-and-socket coupling comprising
   (a) a U-shaped welded support frame having a base and first and second legs extending from said base; said first and second legs being spaced from one another and defining an open side of said frame opposite said base; said first leg forming a ball-holding pin and said second leg being attached to said first railway car;
   (b) a ball traversed and carried by said ball-holding pin;
   (c) a support bracket attached to said second railway car;
   (d) a socket affixed to and carried by said support bracket; said ball nesting in said socket;
   (e) a lid closing said open side of said frame; and
   (f) securing means for releasably attaching said lid to said frame.

7. The combination as defined in claim 6, further comprising a floor carried by one of said railway cars and a rotary platform carried by the other of said railway cars; further wherein said ball-holding pin of said upper ball-and-socket coupling has a longitudinal axis and said ball of said upper ball-and-socket coupling is slidable along the longitudinal axis of said ball-holding pin; and further wherein said lower ball-and-socket coupling comprises means for fixedly securing said ball to said ball-holding pin of said lower ball-and-socket coupling; said lower ball-and-socket coupling being situated between said floor and said rotary platform.

* * * * *